Oct. 7, 1958 N. L. BARLOW ET AL 2,855,505
MODULATING TONE AND BIAS SUPPLY
Filed March 22, 1954
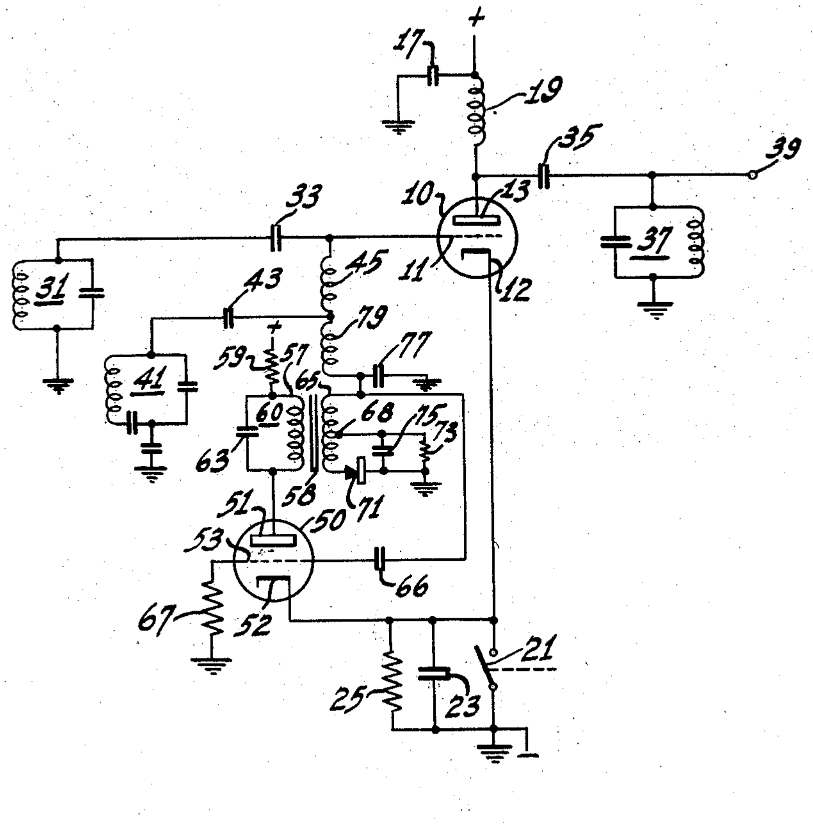
INVENTORS
NILES L. BARLOW &
WILLIAM J. WINCH, JR.
BY Charles H. Brown
ATTORNEY United States Patent Office 2,855,505

Patented Oct. 7, 1958

2,855,505

MODULATING TONE AND BIAS SUPPLY

Niles Linden Barlow, Mamaroneck, and William James Winch, Jr., Brooklyn, N. Y., assignors to Radio Corporation of America, a corporation of Delaware Application March 22, 1954, Serial No. 417,624

5 Claims. (Cl. 250—8)

The invention relates to radio frequency amplifying circuits. It particularly pertains to amplifying circuits following a source of continuous wave oscillations and arranged to tone modulate those oscillations for radio telegraph transmission.

Tone modulated high frequency waves, termed Type A2 emission in the regulations of the Federal Communications Commission, are used to insure reception of messages by receiving stations over great distances and under extremely adverse transmission conditions, particularly in emergency communications.

A transmitter arranged for tone modulated emission must include more components than those required for straight continuous wave emission. In fixed stations or shipboard installations this is not a serious handicap. However, in other types of emergency equipment such as lifeboat radio transmitters, firefighting pack radio sets, and the like, any unnecessary weight or bulk is to be avoided. Generally, all transmitters, whether tone modulated or not, require a source of fixed bias. The known fixed bias supply circuits, which are usually of the same form of power supply as the anode operating supply delivering fairly large potentials at rather low currents are heavier and bulkier than the proportional power ratings would imply.

An object of the invention is to provide a light-weight, compact tone-modulated continuous-wave transmitter for emergency communications systems.

Another object of the invention is to provide a bias supply for a transmitter which does not require any vibrators, vacuum tubes, or transformers in addition to those required for the conventional tone-modulated continuous-wave transmitter.

A feature of the invention is a circuit having means insuring that the bias potential is proportional to the modulating tone voltage.

The objects of the invention are obtained in a circuit arrangement wherein a portion of the output of a tone voltage generator is rectified, filtered and applied as negative direct fixed bias potential superimposed with the derived tone voltage onto the grid or other modulation input of a tone modulated power amplifier tube. The tone generator includes an audio frequency transformer having a plurality of windings of which two windings, or a single winding with a central tapping, are connected in series in the grid circuit of a grid modulated power amplifier tube. A rectifier element and filter element are connected to one winding, or between the intermediate tapping and one end of the tapped winding, to produce a unidirectional bias potential upon which the audio frequency tone voltage developed across the other winding, or the other portion of the tapped winding, is effectively superimposed. It is now obvious that if the amplitude of the tone voltage should increase, or decrease the bias potential level will increase or decrease accordingly.

In order that the invention may be more clearly understood and readily put to practical use, the circuit arrangement embodying the invention is hereinafter described, by way of example only, with reference to the accompanying drawing forming a part of the specification and showing a schematic diagram of a grid modulated amplifier and combination tone voltage generator and bias supply circuit arrangement according to the invention.

Referring to the drawing, there is shown a tone modulation amplifier circuit comprising a controlled electron flow path device in the form of an electron discharge device or high vacuum tube 10 having an input circuit 31 between an input electrode or grid 11 and a common electrode or cathode 12 and an output circuit 37 between an output circuit electrode or anode 13 and the common electrode 12. Anode potential is applied to the tube 10 by connecting the positive terminal of an anode potential supply, which positive terminal is preferably bypassed for radio frequencies to a point of neutral fixed reference potential or ground by means of a capacitor 17, through a radio frequency choke 19 to the anode 13 of the amplifier tube 10. The negative terminal of the anode power supply, which is preferably maintained at a neutral point of fixed reference potential or ground is applied through a keying element 21 to the cathode 12. The keying element 21 may be in the form of the well-known hand telegraph key, a mechanical automatic key present to send any desired prearranged message, or an electronic keying circuit wherein the keying element 21 shown is replaced by the anode-cathode path of an electron discharge device or other type of controlled electron flow path device. It is common practice to maintain the shape of the keying wave by means of a capacitor 23 shunted across the contacts of the keying element 21 and in order to discharge this capacitor to prevent injury to the technician when the anode potential is removed, a resistor 25 is shunted across the capacitor 23. Continuous wave oscillations obtained from a source shown here only as a resonant circuit 31 are applied by way of a coupling capacitor 33 between the grid 11 and the cathode 12 for tone modulation, keying, and amplification. The output tone modulated waveform is delivered from the anode 13 by way of an output coupling capacitor 35 to an output resonant circuit 37 and output terminals 39. The resonant circuits 31 and 37 are usually, but not necessarily, tuned to resonance at the same operating frequency. Another input voltage wave from a source shown here as another resonant circuit 41 may also be applied by way of another input coupling capacitor 43 and an isolating radio frequency (R. F.) choke 45 to the input circuit of the vacuum tube 10. The resonant circuit 41 may then be tuned to another frequency to which the resonant circuit 37 or another circuit (not shown) must be tuned in order to obtain an output wave. The two output circuits may be switched as desired, but preferably another arrangement of the resonant circuit 37 according to the teachings of Niles L. Barlow and Karl L. Neumann disclosed in the copending U. S. Patent application, bearing Serial Number 417,796 and filed on March 22, 1954 may be used, wherein the resonant circuit 37 is made to exhibit parallel resonance at both of the frequencies to which the circuits 31 and 41 are resonant. In such an arrangement there need be no harmonic relationship between any of the frequencies.

The continuous wave energy obtained from either resonant circuit 31, 41 or both is modulated by an audio frequency tone voltage produced in a tone generator comprising a controlled electron flow path device, shown here in the form of a vacuum tube 50, but which may be any suitable electron discharge device, or other controlled electron flow path device. According to the invention, the electron discharge device or vacuum tube 50 comprises an oscillating circuit defined by a collector or anode electrode 51 and a common circuit or cathode electrode 52 and a feedback circuit between an exciting electrode or grid 53 and the common circuit electrode or cathode 52. An inductance element in the form of one winding 57 of a transformer 58 is connected between the anode 51 and the positive terminal of a source of unidirectional potential, preferably through a potential dropping resistor 59. In many instances the inductance and the distributed capacity of the winding 57 will be found to resonate at a frequency near the desired tone frequency; however, if this is not the case, a resonant circuit 60 is obtained by shunting the winding 57 with a capacitor 63 of such value at which the circuit 60 is resonant to the desired tone frequency. The necessary feedback potential for exciting the tone frequency oscillator is obtained from another winding 65 which is coupled to the exciting electrode or grid 53 by means of a capacitor 66 which is prevented from maintaining any permanent charge thereon by a grid resistor 67.

Those familiar with the similarities and the differences between transistors and vacuum tubes will appreciate the fact that the former may be connected in the proper circuitry to realize the results obtainable with the latter without departing from the spirit and scope of the invention. The use of transistorized circuits in pack radio transmitters is fully contemplated by the invention.

The other winding 65 of the transformer 58 has a tapping 68 thereon intermediate the ends of the winding 65. A rectifying element shown here as a semi-conductor rectifier 71 and a load resistor 73 are connected in series between one end of the winding 65 and the central tapping 68 with a filter capacitor 75 shunting the load resistor 73 to remove the A. C. component. The rectifier 71 is poled so that the tapping 68 is maintained at a negative polarity with respect to ground. The filter capacitor 75 must be small enough to charge to the full bias voltage fast enough to insure good keying waveshape. One end of the load resistor 73 is connected to a point of neutral or fixed R. F. reference potential shown as ground. The other end of the other winding 65 is grounded for radio frequency potential by means of a capacitor 77 and is connected to the grid 11 by means of the aforementioned R. F. choke 45 and another R. F. choke 79. The rectifying element 71 may be in the form of a heated cathode vacuum tube rectifier, a germanium crystal, or any other form of unidirectional electron flow device. The audio frequency tone developed in the secondary winding 65 of the transformer 58 is in effect divided into two parts by the tapping 68. One part is rectified and filtered by the above described circuitry to provide a unidirectional bias potential upon which the remainder of the audio frequency voltage is superimposed between the grid 11 and the cathode 12 of the tone modulation amplifier tube 10. It should be noted that as the amplitude of the tone frequency wave varies the bias level also varies in direct proportion.

The one transformer 58 suffices for both the tone generator and the bias supply. The only components above those required for the tone generator are the rectifier 71, the load resistor 73 and the filter capacitor 75. Obviously, the secondary winding 65 may be replaced by two separate windings coupled together. The relative turns ratio of the two windings, or the position of the tapping 68 on the winding 65 is determined by the bias level required for the desired tone modulation level. This presents no practical problem since suitable transformers having varying numbers and sizes of windings and windings with any number of intermediate taps are readily obtainable in the market.

In the practical construction of a transmitter used for lifeboat emergency communications on both 500 kc./s. and 8.364 mc./s., a circuit arrangement according to the invention comprised a tone frequency generator tuned to deliver a tone of approximately 900 cycles per second and a bias voltage of approximately 90 volts, for tone modulating three Type 6146 tubes connected in parallel. In this circuit arrangement the following components parts values were used.

| Ref. No. | Part | Value or Type |
|---|---|---|
| 45 | R. F. Choke | 100 microhenries. |
| 50 | Vacuum Tube | 6AQ5 (with conventional screen supply). |
| 58 | Transformer | Pri. 1.16 henries. Turns ratio 1.34:1. Sec. tapped. |
| 63 | Capacitor | 0.03 mfd. |
| 66 | Capacitor | 0.01 mfd. |
| 67 | Resistor | 100 Kilohms. |
| 71 | Selenium rectifier | Seletron Model 6M1. |
| 73 | Resistor | 100 Kilohms. |
| 75 | Capacitor | 0.02 mfd. |
| 77 | Capacitor | 0.02 mfd. |
| 79 | R. F. Choke | 2.5 mh. |

In this lifeboat transmitter an anode potential supply delivering 625 volts D. C. was the only power supply utilized other than the filament heating supply. Obviously, other component parts values will be used by those skilled in the art to apply the invention to the circumstances at hand without departing from the spirit and scope of the invention.

The invention claimed is:

1. A modulating circuit for tone modulated wave transmission, including an electron discharge device having cathode and control electrodes, means to apply continuous wave energy of relatively high frequency between said control electrode and a point of fixed reference potential, a modulating tone oscillator comprising an electron discharge device having a cathode, a grid and an anode, a transformer having a primary winding connected to said anode and a secondary winding with a tapping thereon, a capacitor interconnecting one end of said secondary winding and said grid, a rectifier element and a resistor connected in series from the other end of said secondary winding to said tapping, a capacitor shunting said resistor, the junction of said resistor and said rectifier element being connected to said point of fixed reference potential, and a lead connecting said one end of said secondary winding to said control electrode.

2. A modulating circuit for tone modulated telegraph wave transmission, including an electron discharge device having cathode, control and anode electrodes, means to apply continuous wave energy of the frequency to be transmitted between the control electrode and a point of fixed reference potential, a modulating tone oscillator comprising an electron discharge device having a cathode, a grid and an anode, a transformer having a primary winding connected to said anode and a secondary winding with a tapping thereon, a capacitor interconnecting one end of said secondary winding and said grid, a capacitor shunting said primary winding to tune the same to resonance at a desired tone frequency, a grid resistor connecting said grid to said point of fixed reference potential, a rectifier element and a resistor connected in series from the other end of said secondary winding to said tapping, a capacitor shunting said resistor, the junction of said rectifier element and said resistor being connected to said point of fixed reference potential, a radio frequency choke connected between said one end of said secondary winding and said control electrode, a lead interconnecting said cathode to said cathode electrode, terminals connected to said cathode electrode and to said point of fixed reference potential, a radio frequency bypass capacitor connected between said one end of said secondary winding and said point of fixed reference potential, and means to short circuit said terminals to produce tone modulated continuous wave output at said anode electrode.

3. A modulator circuit for tone modulated wave transmission, including an electron discharge device having cathode and control electrodes, means to apply continuous wave energy of frequency to be transmitted between the control electrode and a point of neutral fixed reference potential, a modulating tone generator comprising an electron discharge device having a cathode, a grid and an anode, a transformer having a primary winding connected to said anode and a secondary winding with a tapping thereon, a capacitor interconnecting one end of said secondary winding and said grid, a rectifier element and a resistor connected in series from the other end of said secondary winding to said tapping, the junction of said resistor and said rectifier element being connected to said point of neutral fixed reference potential, means connecting said one end of said secondary winding to said control electrode, and a lead interconnecting said cathode to said cathode electrode.

4. A modulator circuit for tone modulated wave transmission, including an electron discharge device having cathode, control and anode electrodes, means to apply continuous wave energy of frequency to be transmitted between the control electrode and a point of neutral fixed reference potential, a modulating tone oscillator comprising an electron discharge device having a cathode, a grid and an anode, a transformer having a primary winding connected to said anode and a secondary winding with a tapping thereon, a capacitor interconnecting one end of said secondary winding and said grid, a capacitor shunting said primary to tune the same to resonance at a desired tone frequency, a grid resistor connecting said grid to said point of neutral fixed reference potential, a rectifier element and a resistor connected in series from the other end of said secondary winding to said tapping, a capacitor shunting said resistor, the junction of said resistor and said rectifier element being connected to said point of neutral fixed reference potential, a radio frequency choke connected between said one end of said secondary winding and said control electrode, and a lead interconnecting said cathode to said cathode electrode.

5. A modulating circuit for tone modulated wave transmission, including an electron discharge device having cathode and control electrodes, means to apply continuous wave energy of relatively high frequency between said control electrode and a point of fixed reference potential, a modulating tone oscillator comprising an electron discharge device having a cathode, a grid and an anode, a transformer having a primary winding connected to said anode and a secondary winding with a tapping thereon, a capacitor interconnecting one end of said secondary winding and said grid, a rectifier element and an impedance element capable of passing direct current connected in series between the other end of said secondary winding and said tapping, a capacitor shunting said impedance element, the junction of said capacitor and said rectifier element being connected to said point of fixed reference potential, and means coupling said one end of said secondary winding to said control electrode.

References Cited in the file of this patent

UNITED STATES PATENTS

| | | |
|---|---|---|
| 1,724,668 | Kummener | Aug. 13, 1929 |
| 2,017,019 | Seeley | Oct. 8, 1935 |
| 2,076,351 | Roosenstein | Apr. 6, 1937 |
| 2,167,461 | Muth | July 25, 1939 |
| 2,233,453 | Kaeser | Mar. 4, 1941 |